United States Patent [19]
Kayan et al.

[11] 3,940,791
[45] Feb. 24, 1976

[54] MAGNETIC TAPE TRANSPORT

[75] Inventors: Helmut L. Kayan, Redwood City; Alfred F. Stahler, San Jose, both of Calif.

[73] Assignee: Ampex Corporation, Redwood City, Calif.

[22] Filed: Aug. 19, 1974

[21] Appl. No.: 498,459

[52] U.S. Cl. ................................ 360/95; 242/199
[51] Int. Cl.² .................. G11B 15/00; G11B 23/04
[58] Field of Search ........ 360/85, 95; 242/199, 184; 226/118, 95

[56] References Cited
UNITED STATES PATENTS

| | | | |
|---|---|---|---|
| 3,720,794 | 3/1973 | Dolby | 360/85 |
| 3,740,495 | 6/1973 | Kihara | 360/85 |

Primary Examiner—Daryl W. Cook

[57] ABSTRACT

A helical scanning rotating head magnetic tape transport is provided for use with cassettes, and is arranged with vacuum means to pull a loop of tape from the cassette and helically around the rotating head scanning drum to a capstan and retracted pinch roller. The pinch roller is then automatically inserted into the bight of the loop, together with an element between the loop shanks to keep them apart during operation, and the vacuum means is then inactivated.

25 Claims, 19 Drawing Figures

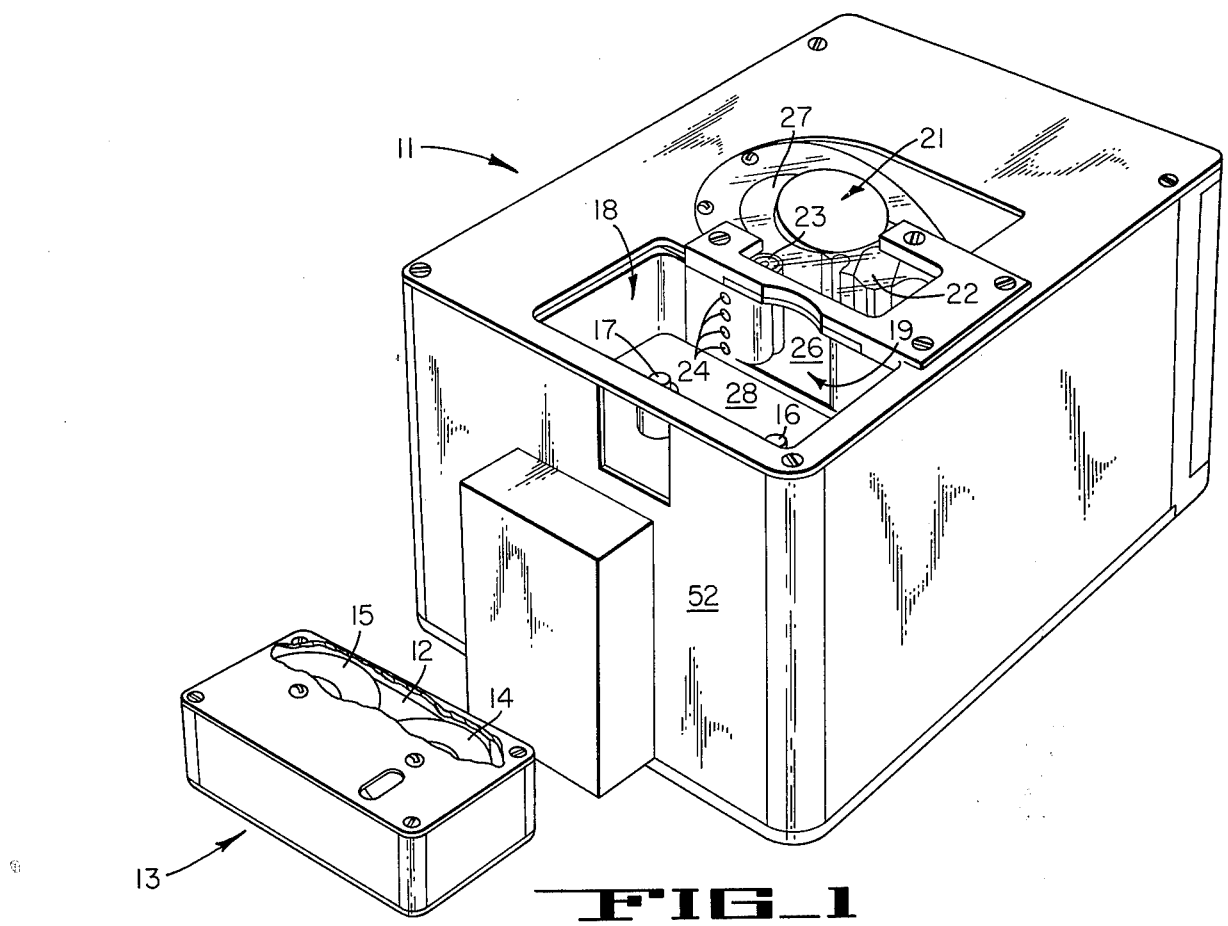
FIG_1
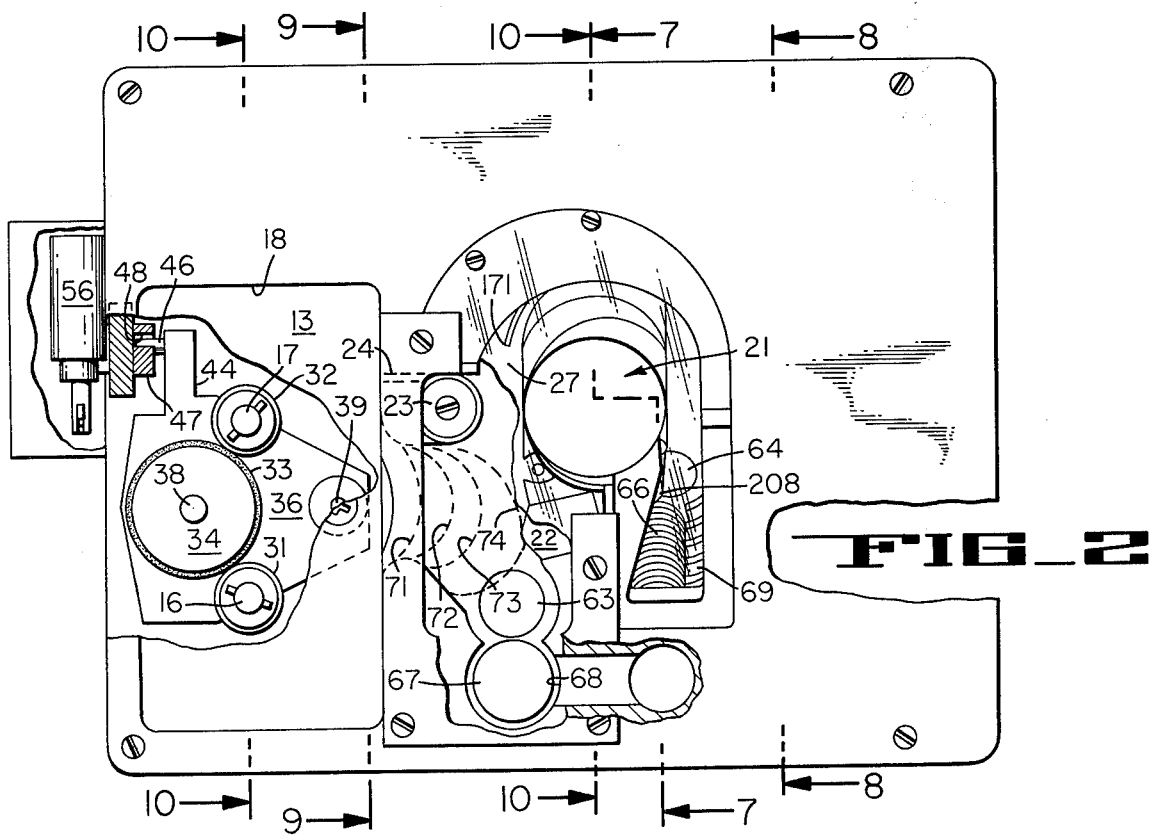
FIG_2

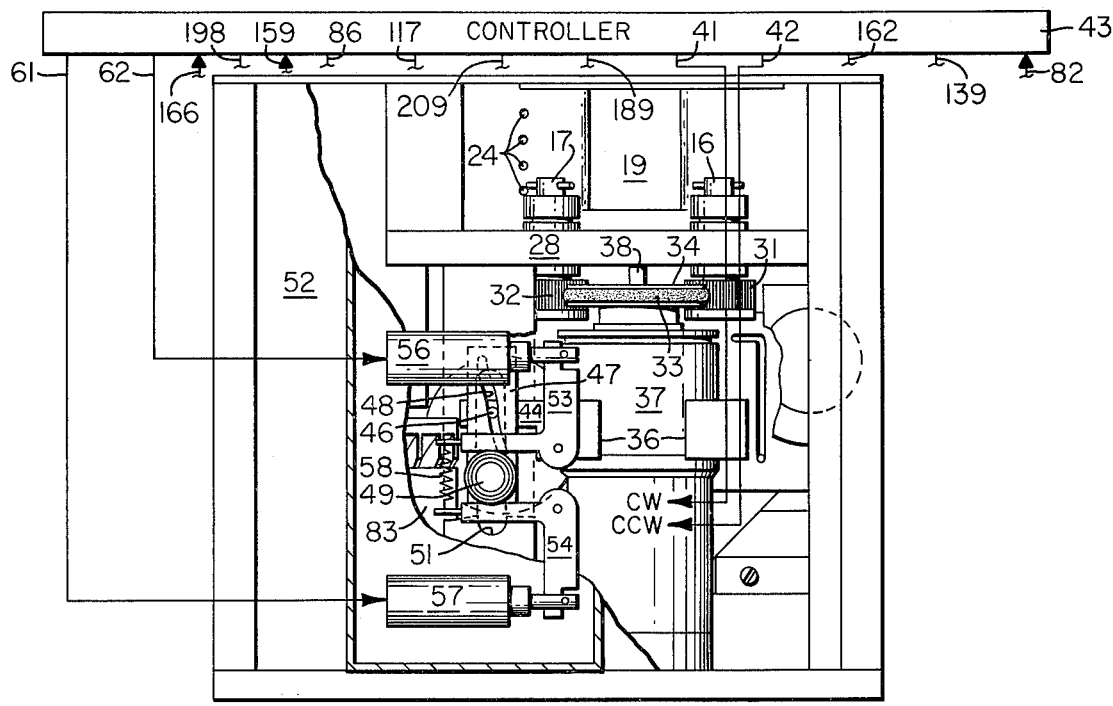
FIG_3
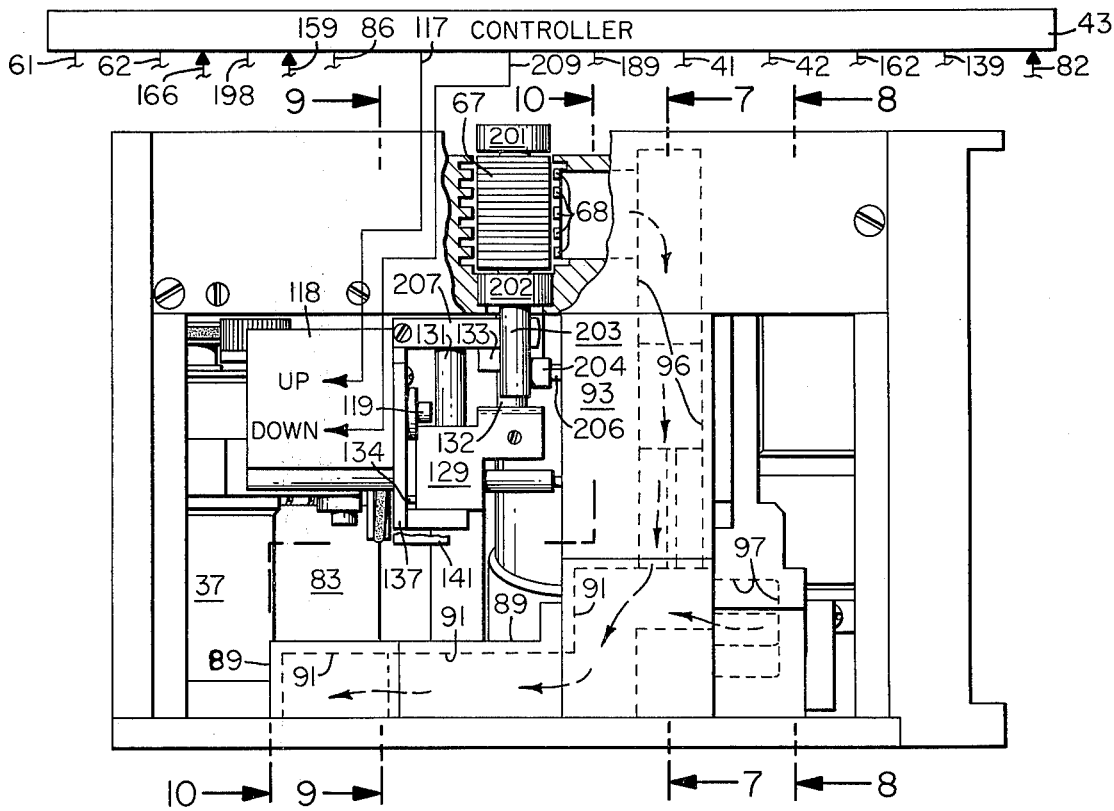
FIG_4

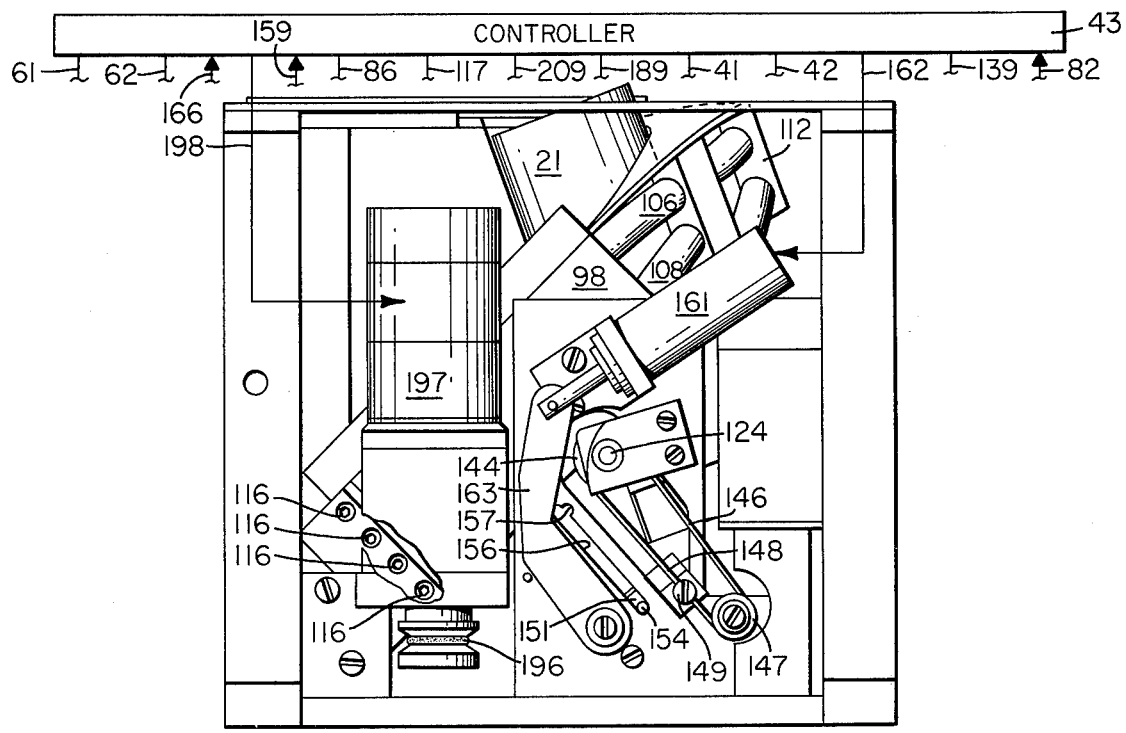
FIG_6
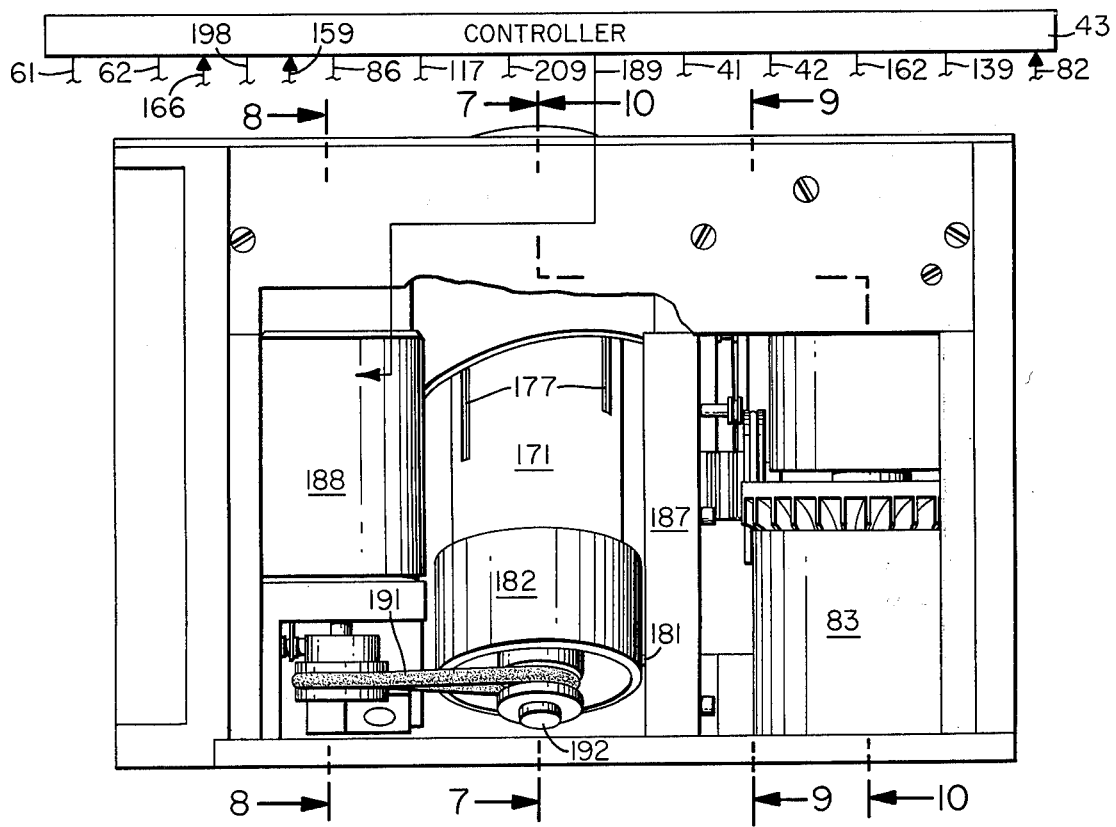
FIG_6

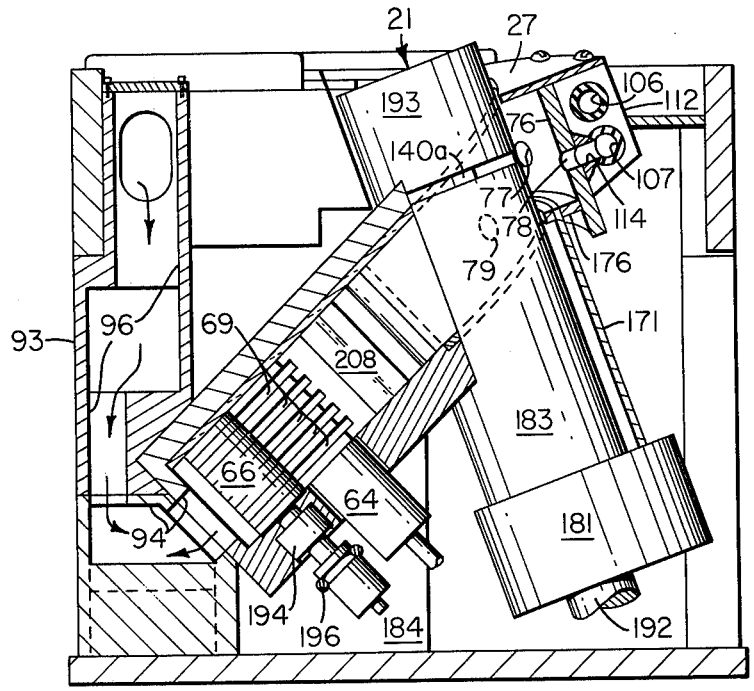
FIG_7
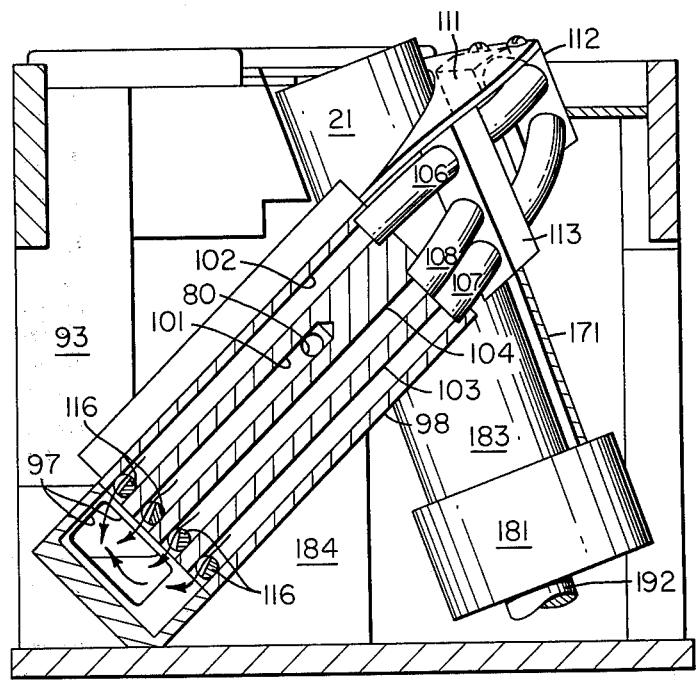
FIG_8

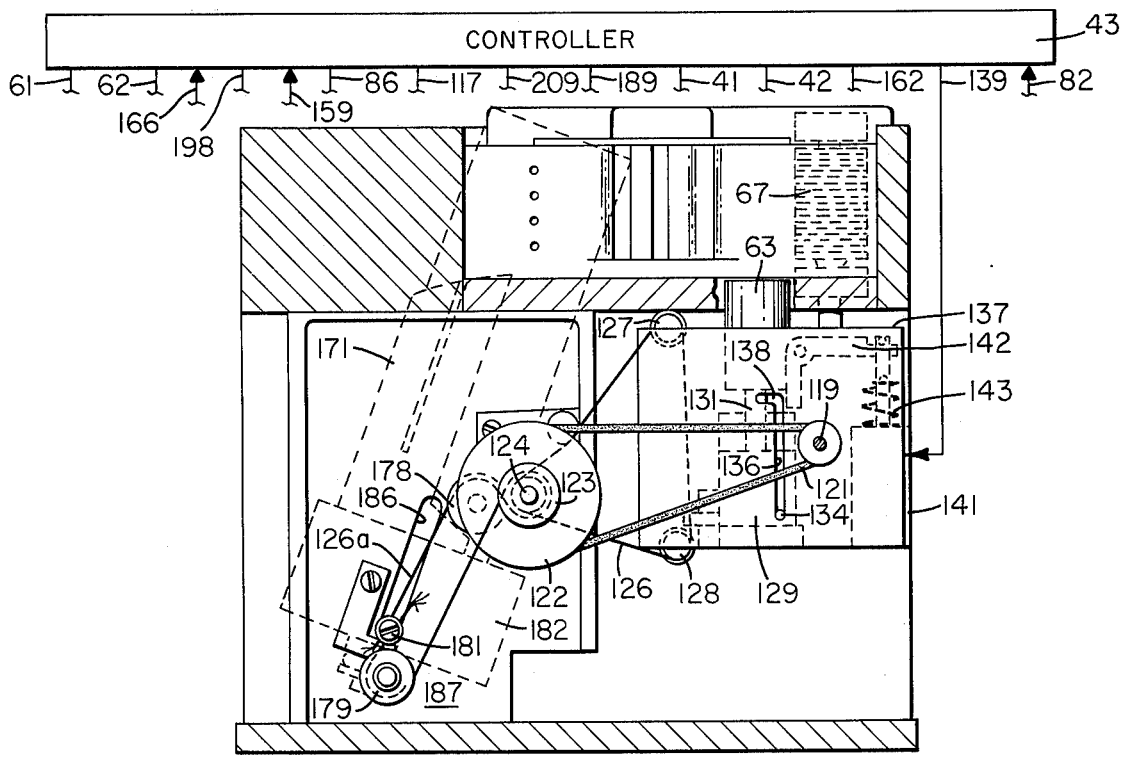
FIG_9
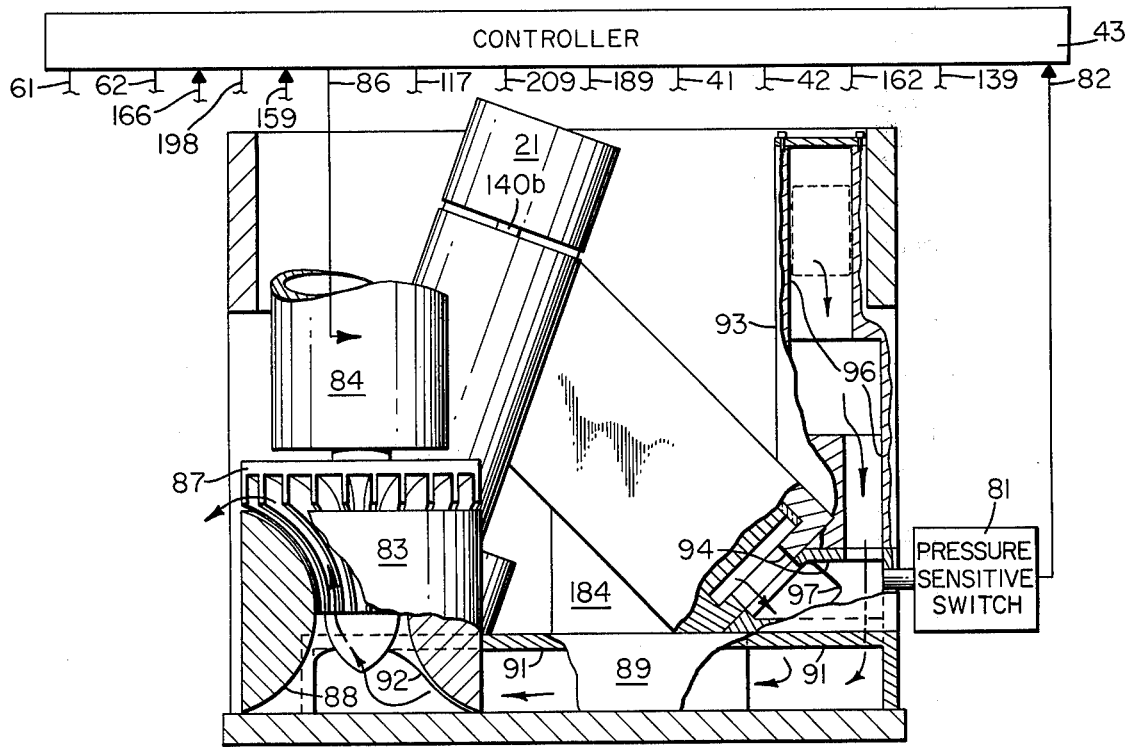
FIG_10

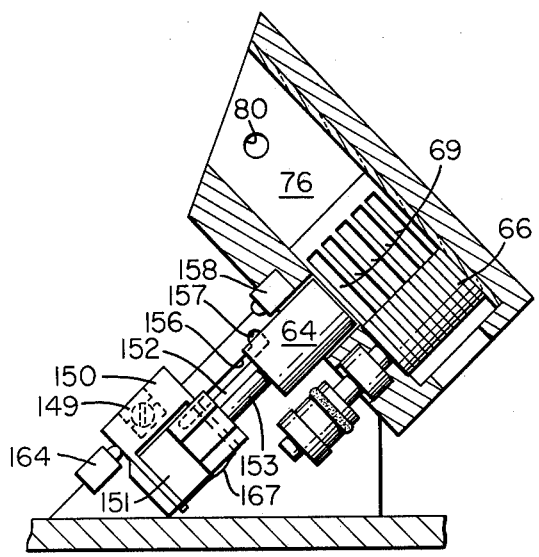
FIG_11
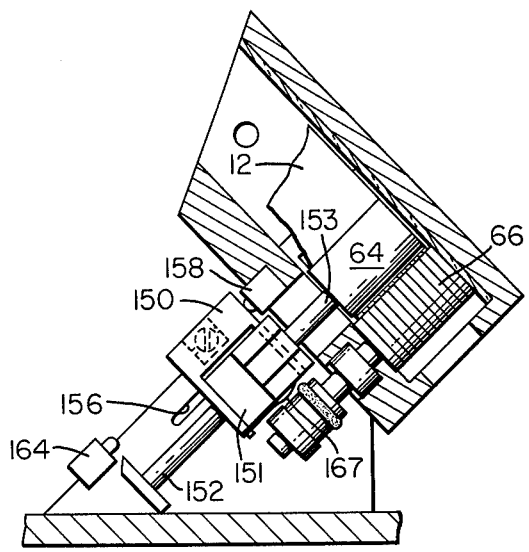
FIG_12
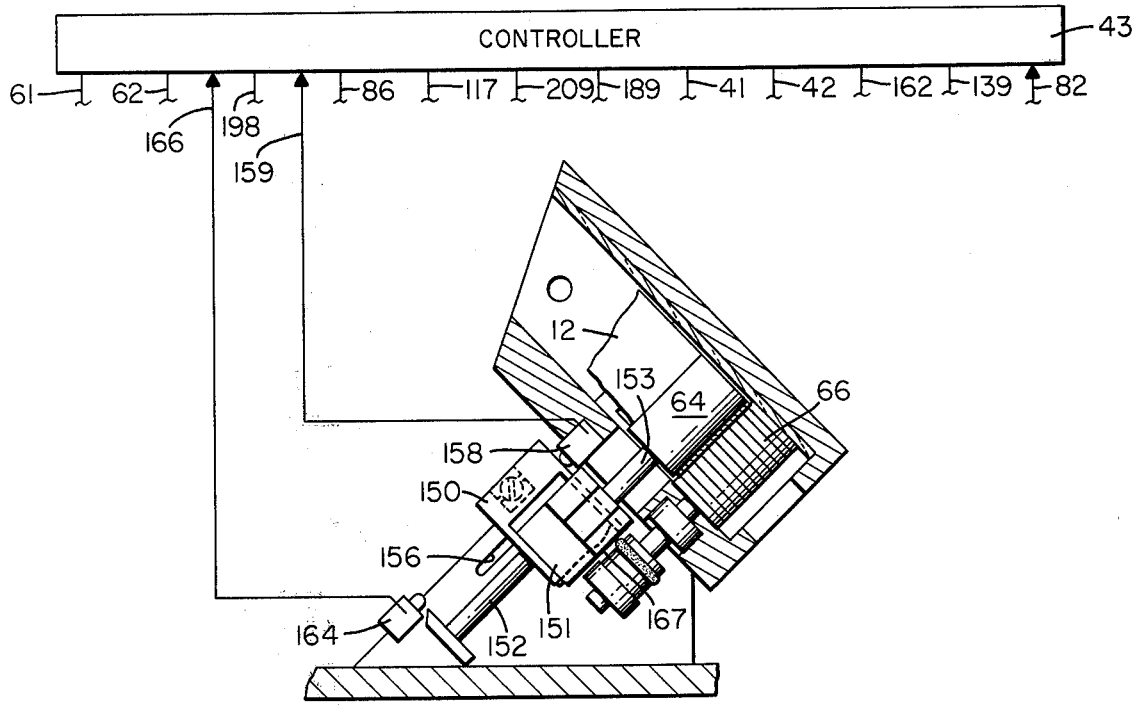
FIG_13

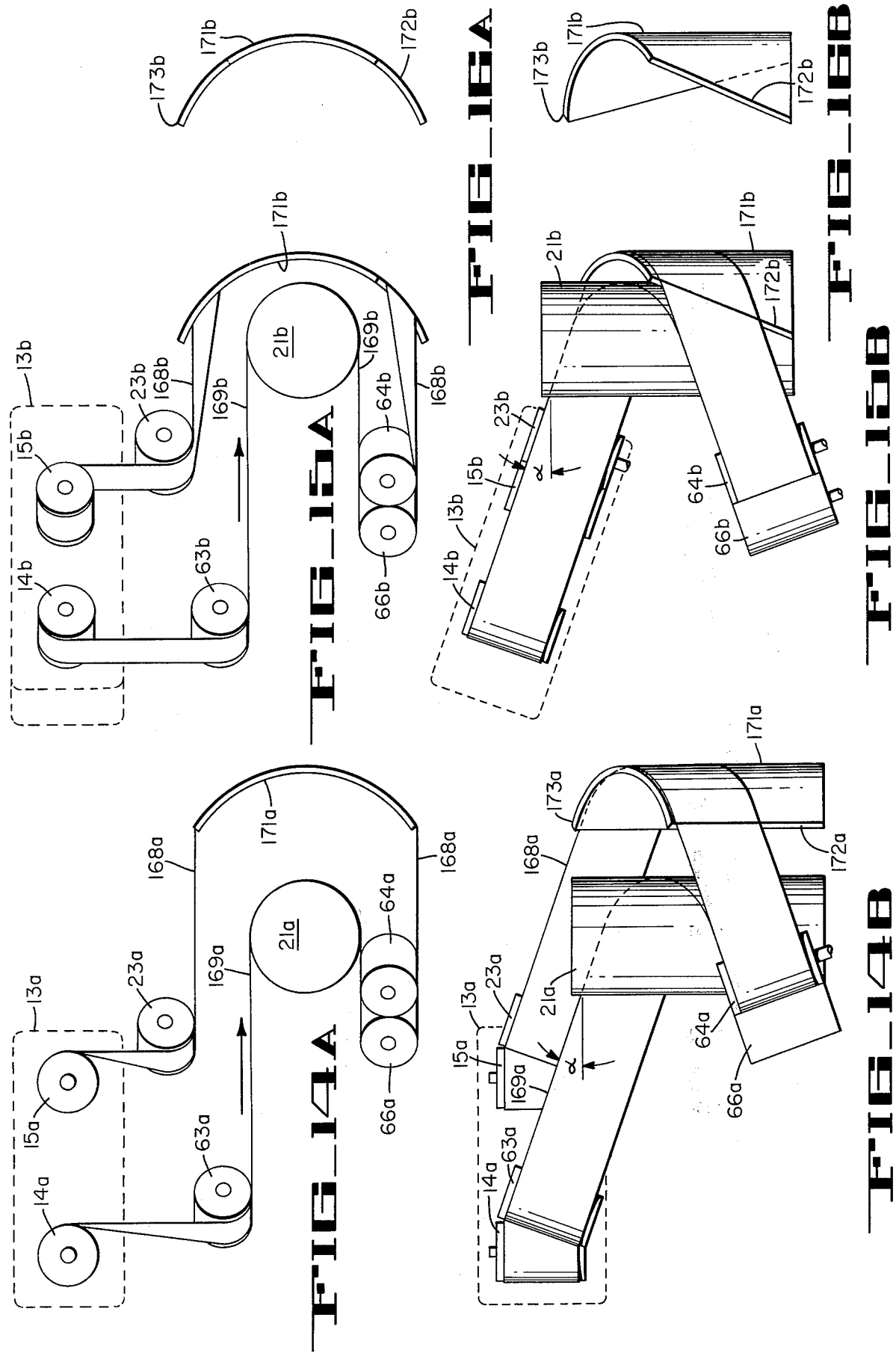

3,940,791

MAGNETIC TAPE TRANSPORT

BACKGROUND OF THE INVENTION

This invention relates to magnetic tape transports of the self-threading type, and particularly to such transports empolying rotating scanning heads and a helical tape path.

Previously, such transports have been provided with mechanical means to draw a loop of tape from e.g. a cassette, wrap the loop around the rotating head scanning drum, insert a capstan and insert a spacing element to keep the shanks of the tape loop apart during operation. However, such mechanical apparatus is cumbersome and complex to manufacture and to operate, and is subject to many sorts of malfunction, besides being quite expensive.

Accordingly, it is an object of the present invention to provide automatic vacuum threading means for helical scan transports; and Another object is to provide such means with increased facility for handling tape from cassettes.

SUMMARY OF THE INVENTION

A helical scanning rotating head magnetic tape transport is provided for use with cassettes, and is arranged with vacuum means to pull a loop of tape from the cassette and helically around the rotating head scanning drum to a capstan and retracted pinch roller. The pinch roller is then automatically inserted into the bight of the loop, together with an element between the loop shanks to keep them apart during operation, and the vacuum means is then inactivated.

DESCRIPTION OF THE DRAWINGS

FIG. 1 is a broken away perspective view of a magnetic tape transport and cassette in accordance with the invention;

FIG. 2 is a broken away plan view, to an enlarged scale, of the apparatus of FIG. 1, with the cassette inserted;

FIG. 3 is a partly schematic broken-away right side view of the apparatus of FIG. 2;

FIG. 4 is a partly schematic broken-away front side view of the apparatus of FIG. 2;

FIG. 5 is a partly schematic broken-away left side view of the apparatus of FIG. 2;

FIG. 6 is a partly schematic broken-away rear view of the apparatus of FIG. 2;

FIG. 7 is a broken-away cross-section taken on the plane of lines 7—7 of FIG. 2;

FIG. 8 is a fragmented cross-section taken on the plane of lines 8—8 of FIG. 2;

FIG. 9 is a partly schematic broken-away cross-section taken on the plane of lines 9—9 of FIG. 2;

FIG. 10 is a partly schematic broken away cross-section taken on the plane of lines 10—10 of FIG. 2;

FIG. 11 is a fragmentary view taken on the same plane but oppositely to the section of FIG. 7, and illustrating the operation of the apparatus;

FIG. 12 is a view similar to FIG. 11, illustrating further operation of the apparatus;

FIG. 13 is a view similar to FIG. 12, illustrating further operation of the apparatus;

FIG. 14a is a schematic plan view illustrating a variational form of a portion of the apparatus;

FIG. 14b is an elevation of the structure shown in FIG. 14a;

FIG. 15a is a schematic plan view illustrating the structure of a portion of the apparatus;

FIG. 15b is an elevation of the structure shown in FIG. 15a;

FIG. 16a is a plan view of a portion of the structure shown in FIG. 15a; and

FIG. 16b is an elevation of the structure shown in FIG. 16a.

DESCRIPTION OF THE PREFERRED EMBODIMENTS

Referring now to FIG. 1 of the drawing, there is shown a tape transport 11, for recording and playing a magnetic tape 12 contained in a cassette 13. The cassette includes a supply reel 14 and a takeup reel 15, both of which are adapted, in a manner well known in the art and not here shown, to fit upon keyed spindles 16 and 17 for driving and tensioning the tape during threading and operation. The spindles 16, 17 protrude into a cassette mounting cavity 18 of the transport, which supports and positions the cassette with the sides thereof orthogonally aligned paralleling the corresponding sides of the transport. Also shown in FIG. 1 is a portal 19 for drawing a loop of tape from the cassette and into a helical path around a rotating head drum and coaxial scanning guide assembly 21, a stationary erase head 22, a rotating guide 23, and four ports 24 for venting atmospheric pressure air into a tape loop housing 26 defined in part by the portal 19, the head and guide 22, 21, and a curved transparent plastic roof structure 27 which follows the helical path of the tape loop.

In FIG. 2, the cassette 13 is shown in place in the cavity 18, but is broken away together with the floor 28 of the cavity to show how the reel spindles 16, 17 are driven. Each spindle has a driven portion 31, 32 one or the other of which may be engaged by a rubber tire 33 of a drive wheel 34, as by means of a pivoting mounting bracket 36 upon which is mounted a motor 37 (all shown as well in FIG. 3). Upon the shaft 38 of motor 37 is mounted the drive wheel 34. The bracket 36 is pivoted on a fixed shaft 39. If the bracket is pivoted in a clockwise direction as shown in FIG. 2, while the motor 37 is caused to turn in a clockwise direction, then the tape reel 15 is made to operate as a takeup reel for normal recording and playback, or fast forward operation. If the bracket is pivoted counterclockwise with the motor turning counterclockwise, then the reel 14 is caused to operate as a takeup reel for rewinding the tape. For threading the tape, a loop of tape must be pulled by vacuum means (described below) from one or the other of the tape reels. As will be more fully explained below, either of the reels may be used as the threading feed reel, depending on differences in other structure. Whichever reel is to be the feed reel, however, there are still two ways in which it may be operated. If the vacuum is strong enough to actually pull the tape off the reels against the normal inertia and frictional resistance thereof, then the motor 37 may be held at "stop" and pivoted by bracket 36 against the other reel drive so as to brake it and force the vacuum to pull all the loop forming tape from the desired feed reel. Conversely, if the vacuum is not strong enough to actually pull tape off the reels, which is the case in the illustrated apparatus as it was actually constructed and operated, then the motor is pivoted against the drive spindle for the desired feed reel (i.e., reel 15 in the illustrated apparatus), and is operated in the correct direction to pay out tape from that reel (i.e., counterclockwise for reel 15). This, of course, is the direction opposite to that in which the motor would drive the reel for play-record or winding operation.

As may be seen in FIG. 3, the motor 37 is controlled for operation in either direction (forward cw or reverse ccw) by means of control lines 41, 42 coupled to a controller 43. The controller may comprise a specially designed logic circuit of any of a number of well-known types, or it may comprise a general purpose digital computer programmed to carry out the functions described in this specification.

The pivoting of the bracket 36 toward one or the other of the reels is also illustrated in FIGS. 2 and 3. Projecting from an extension 44 of the bracket is a pin 46, which acts as a cam follower to a vertically sliding cam 47, the cam surfaces of the cam being formed by two sides of a slot 48, into which the pin 46 fits. The slot 48 has a central vertically directed plateau zone, which when it is aligned with pin 46 as shown in FIG. 3, defines a dead center position for the wheel 34, engaging neither reel driving element 31 or 32. The slot 48 is inclined in a direction away from wheel 34 above the central plateau, and toward wheel 34 below the central plateau, terminating at each end in a vertically directed end plateau. Thus when the cam 47 is moved downwardly, wheel 34 is engaged to drive reel 15, and when the cam is moved upwardly, the wheel is engaged to drive reel 14. The cam is mounted on a flanged button 49 projecting through and sliding in a slot 51 in the end wall 52 of the transport, and the button is engaged top and bottom by two bell cranks 53 and 54 pivoted on the end wall 52 and operated alternatively by a pair of solenoids 56 and 57 also mounted on the end wall. In the absence of energization of one or the other solenoid 56, 57, a spring 58 holds the ends of the bell cranks together and keeps or returns the cam and wheel 34 to dead center (inoperative) position.

Operation of the solenoids 56, 57 is controlled by lines 61, 62 from the controller 43. For example, for forward tape operation (play-record) controller 43 is programmed to energize line 62 to pivot wheel 34 clockwise (FIG. 2), concurrently with line 41, to rotate wheel 34 clockwise (FIG. 2). For reverse (rewind) operation, the controller energizes line 61 concurrently with line 42. For threading operation, the controller energizes line 62 concurrently with line 42, to feed a loop out from reel 15, through the portal 19, and around the guide 21.

THE VACUUM SYSTEM

During threading, the tape loop formed by feeding action of reel 15 must be pulled by some means into its operational position, since rotation of the reel merely frees the tape and cannot push it. In the present invention a vacuum system is used, which pulls the loop first into position for encompassing a retracted idler 63, and then around the guide 21 to a position for encompassing a retracted pinch roller 64, which is located adjacent a capstan 66, at the bight of the loop. After the loop arrives at both of these positions, the idler 63 and pinch roller 64 can be raised to enter the loop and hold it in a substantially 180° helical band around the scanning guide 21, and against the head 22, and the vacuum can be turned off. While the cassette could have been oriented about 90° ccw from its illustrated position, so that reel 14 is approximately in the position of idler 63, there were several considerations dictating the illustrated arrangement, including optimum use of the available space, and the desirablility of using the separate idler 63 not only as a guide but also as part of a drag-idler tensioning and holdback system for the tape, in conjunction with a drag idler 67 later to be described. Here it is only noted that, given the need for idler 63, the vacuum system must be arranged for pulling at first more strongly from the direction of idlers 63, 67 than from the direction of capstan and pinch roller 66, 64, in order to ensure that a branch of the loop be formed at idler 63. This requirement is met by means of vacuum ports 68 and 69, acting in cooperation with the feeding of tape from reel 15 rather than from reel 14, and with the cooperation of ports 24 previously mentioned. The cooperative functioning works as follows. As the tape loop that is fed from reel 15 comes into the vacuum housing 26, its progress (illustrated by dashed lines 71, 72, 73 and 74) closes first the portal 19, and then engages the far wall (head 22), partitioning the housing into two separate portions (see line 74); one portion being evacuated by ports 68, and the other by ports 69. However, the later portion is also vented to atmosphere by ports 24 previously mentioned. Consequently, the portion of the housing that is evacuated by ports 68 has the lowest vacuum pressure and the tape loop is pulled, as it further grows, to the end of the chamber adjacent drag idler 67 and encompassing retracted idler 63. When fully extended to idler 67, the loop can grow no further in that direction, and further growth extends it in the other direction, past ports 24 and around the bend past guide 21 to the end of the chamber at capstan 66 and vacuum ports 69. To keep the two shanks of the loop apart as they go around the bend past guide 21, the outer side wall 76 (FIGS. 7, 8, and 11) is provided with four spaced ports 77, 78, 79, and 80, which are also coupled to the vacuum system. The inner portion of the loop "unrolls" so to speak around the inner wall of the housing defined by guide 21 and there is no frictional relative motion. As for the outer portion of the loop sliding against the outer wall of the housing, frictional motion is at least partly lubricated by air from ambient atmosphere, admitted through ports 24. Nevertheless, the ports are to a considerable degree closed off from the housing volume downstream from the advancing loop bight, and the differential pressure acting to pull the loop increases, after the loop has passed the ports 24.

When the loop at last reaches the capstan 66 at the end 69 of the chamber, substantially all of the atmospheric air is cut off from the system, and the resulting pressure drop is sensed by a pressure sensitive switch 81 (FIG. 10) coupled to the system, which notifies the controller through a signal line 82, so that the controller can initiate the next steps of the threading program.

The vacuum source for the system comprises a vacuum pump 83 (FIG. 10) and motor 84 therefor, driven by the controller as indicated by line 86. The motor rotates a vaned rotor 87 which causes centrifugal pumping of air from a baffled central chamber 88. A rectangular conduit 89 having an interior passage 91 communicates at one end with the chamber 88 by means of a portal 92, and at the other end with a vertical hollow shaft 93 having an interior passage 94 communicating with the vacuum ports 69 adjacent the capstan 66 (FIGS. 4, 7, and 10). A vertical interior passage 96 of the shaft 93 communicates with the ports 68 adjacent the drag idler 67; and a horizontal passage 97 communicates with a manifold 98 for collecting air from the tape loop housing side ports 77–80. Inside the manifold (FIG. 8), a passage 101 communicates directly with the port 80, and passages 102, 103 and 104 communicate respectively with flexible tubular conduits 106, 107 and 108 and thence with loop side ports 77, 78 and 79 respectively. While not specifically shown in the drawing, the connections of conduits 106, 108 with ports 77, 79 are substantially the same as the illustrated connection (FIG. 7) of conduit 107 and port 78, further described below. Brackets 111, 112 and 113 are mounted on the side wall 76 of the vacuum housing and serve to terminate the conduits as well as to support conduits that pass further. For example, bracket 111 (FIG. 8) serves to terminate conduit 106 and couple it to port 77; bracket 112 (FIG. 7) serves to support conduit 106, which passes through the bracket, and also to terminate conduit 107 and to couple conduit 107 to port 78 through an intermediate passage 114; and bracket 113 (FIG. 8) serves to support conduit 106 and 107 and to terminate conduit 108 and to couple conduit 108 to port 79 (shown only in phantom in FIG. 7).

Also shown in FIG. 8 are four valve gate elements 116, which may be used to regulate the vacuum pressure levels in the various conduits and manifold passages 101–104. Each gate element consists of a half-round pin teerminating in fully rounded ends turning in corresponding journals in the manifold, the outer accessible ends having hexagonal socket recesses therein for turning by socket wrench, as shown in FIG. 5.

THE TAPE DRIVE AND TENSIONING SYSTEM

Having received a signal from the pressure sensitive switch 81 indicating that the tape loop is fully loaded, the controller 43 immediately stops the feeding of tape by stopping motor 37. The controller may also be programmed to respond to the signal from switch 81 to return the wheel 34 to neutral position, but preferably the wheel is left engaged with reel 15 in "standby" mode, ready to drive this reel counter-clockwise as the takeup reel for forward play-record operation. The next step in preparing to operate is the step of inserting the pinch roller 64 and the drag idler pinch roller 63.

The insertion of the rollers 64, 43 is initiated by signal from the controller 43 through line 117 (FIG. 5) to energize a motor 118 (FIG. 4). To produce an up movement of the rollers 63, 64, motor 118 is energized to rotate the drive shaft 119 thereof in a counter-clockwise direction as seen in FIG. 9. Shaft 119 drives a belt 121, which, through pulleys 122 and 123 on a common shaft 124, drives a belt 126 to move in a vertically upward direction between a pair of fixed guide pulleys 127, 128. In this vertical stretch of belt 126, the belt is coupled to a bracket 129 which slides upon a fixed vertical shaft 131 (see also FIG. 4) and serves to mount the shaft 132 and bearing 133 of roller 63 first for movement upward into the branch of the tape loop adjacent drag idler 67, and subsequently for pivoting motion eccentrically around fixed shaft 131 to pinch the tape against drag idler 67. The idler 63 in upward movement is held in spaced relation to the drag idler 67, with the tape between, by means of a pin 134 extending from the bracket 129 and sliding in a vertical slot 136 (FIG. 9) that is formed in a fixed mounting plate 137 (for motor 118). The slot 136 has a horizontal bend 138 at its upper extremity to permit the pivoting pinching motion of idler 63. This motion is initiated by the controller 43 either as soon as it receives a signal (described below in relation to pinch idler 64) that the idlers are in up position; or alternatively, the controller 43 may be programmed to delay such pinching action until it receives from the operator a play-record signal conjuctive with the roller-up signal. This standby mode, with tape loose between the pinch and drag rollers, is useful in saving wear on the tape and rotating heads 140a and 140b, which are most advantageously kept rotating so as to be up to speed for use when desired. Either way, at the correct time, controller 43 energizes through a line 139 (FIG. 9), a solenoid 141, which operates a bell crank 142 to push the pin 134 horizontally into the upper bend 138 of slot 136. A return compression spring 143 returns the bell crank 142 to inoperative position when the solenoid 141 is later de-energized, as at the end of the play-record mode.

The pinch roller 64 is operated in a similar manner. An extended portion of the shaft 124 (FIG. 9) goes through the transport to drive a pulley 144 and a pulley 147, with a run 148 of the belt extended parallel to the insertion direction of motion of the pinch roller 64. This run of the belt 146 is coupled by means of clamp 149 to a sliding non-pivoting bracket 150, better shown in FIGS. 11–13. Bracket 150 slides on a fixed shaft 152, and has two upper and lower flanges between which fits a sliding and pivoting bracket 151, also mounted on fixed shaft 152. The sliding-pivoting bracket 151 mounts pinch roller 64 and its shaft 153 and bearing (not shown) for sliding and eccentric pivoting motion about fixed shaft 152. Likewise a pin 154 (FIG. 5) extends from bracket 151 to ride in a guide slot 156 formed in the mounting structure, with a 90° bend 157 at the upper end to permit pivoting of the pinch roller from non-pinching to pinching position against the capstan 66. At the upper end of traverse, the bracket 151 engages a microswitch 158 (FIGS. 11—13) which signals to the controller through a line 159 that the rollers are "up". The controller then, or at an appropriate time, energizes the solenoid 141 through line 139, and also energizes a solenoid 161 through a line 162 (FIG. 5), which operates through a lever arm 163 to push the pin 154 into the upper bend 157 of slot 156, thus pivoting the pinch roller 64 into pinching engagement with the tape and capstan 66. FIGS. 11–13 show the sequence: in FIG. 11 the pinch roller 64 is retracted with no tape in the chamber; in FIG. 12, the pinch roller 64 is "up" but not pinching; and in FIG. 13, the pinch roller has been pivoted into pinching position.

Also shown in FIGS. 11–13 is a bottoming microswitch 164 and signal line 166 therefrom, for use during unloading of the tape loop to signal when the rollers are "down". A return spring 167 also couples brackets 150 and 151 to return the bracket 151 and pin 154 to non-pinching position when the solenoid 161 is de-energized.

It will also be understood that the "up" signal from microswitch 158 may be used by the controller to immediately turn off the vacuum source motor 84, and the motor 118. Alternatively, the controller may be programmed to leave the motor 118 energized in standby condition with belt 126 slipping, in order to ensure that the rollers remain in fully up position until they are moved to pinch condition, as at the beginnibg of play-record mode.

THE LOOP SHANK SEPARATING MEANS

It has already been mentioned that the vacuum source is inactivated during play-record operation, and it will be understood that some means is required to hold the outer shank 168 of the tape loop (see FIG. 15a for example) away from the inner shank 169 during this mode, to prevent rubbing of the two shanks. In any event, the vacuum system could not hold the shanks apart without causing rubbing of the outer shank against the outer housing wall 76, which is also undesirable, because the rubbing surface of the tape would be the oxide surface on which the magnetic recording is made. Instead, a separating element 171 is provided (FIGS. 15 and 16), which is arranged to be automatically inserted between the two tape shanks concurrently with the pinch rollers, and which serves to support the non-oxide face of the outer shank 168 and hold it away from the inner shank.

Before considering the insertion means, it will be of benefit to study FIGS. 14–16, which illustrate two different arrangements for mounting the cassette and the shank separating means. In FIG. 14 is shown a cassette 13a mounted in a plane normal to the axis of scanning guide 21a, that is with the reel axes parallel to the axis of guide 21a. To divert the tape into the correct pitch angle α for the helical scan path around guide 21a, there must be provided guides 63a and 23a inducing twists in the tape between the guides and reels. If the axes of reel 14a and guide 63a lie in parallel planes that are mutually perpendicular to the centerline of the twisted portion of tape, then the guide 63a can be a rotating guide, rather than a fixed post, without danger of the tape being driven axially off the end of the guide. The same relationship would hold true for guide 23a and reel 15a. The tape in forward motion then moves from reel 14a, around guide 63a, around guide 21a, and to the capstan 66a and pinch roller 64a. These rotating elements must be axially perpendicular to the centerline of the tape both upstream and downstream therefrom, in order to avoid driving the tape axially off one end of the capstan or pinch roller. This requirement dictates that the outer shank of the tape loop must climb back around the guide 21a at precisely the reverse of pitch angle α, and on a greater path length, so long as guide element 171a is of simple cylindrical form with all generatrices and its upstream and downstream edges 172a and 173a all parallel to the axis of guide 21a. The result is that the returning portion of outer shank 168a comes out at a higher level than the ingoing portion of inner shank 169a, at least when the guide is looked at as if tilted with these tape portions horizontal. Of course, in the illustrated embodiment, this difference in level is compensated for by the chosen orientation of the cassette 13a and the twists induced in the tape between the reels and guides 63a, 23a.

The structure thus far described, however, is open to one objection in that any twist induced in the tape, at least upstream from the scanning guide 21, has a deleterious effect on recording and reproduction accuracy. In a twisted tape the edges are substantially more elongated than the centerline. Both the tension and recorded wavelengths therefore vary across the tape width. Changes in temperature and humidity cause non-rectilinear variations in the tensions across the tape width. Without careful control of environmental conditions, therefore, a tape recorded on one day may not be satisfactorily reproducible on another day, even on the same machine. It is possible to eliminate the deleterious effects of twisting the tape, by suitable crowning of the rollers 63a and 23a, and the arrangement of FIG. 14 is consequently generally envisioned as a practical embodiment of the present invention. However, because in the preferred embodiment shown in FIGS. 1 and 2, the element 63 is to be used as a pinch roller for a tape tension regulating drag idler 67, and because crowning the roller 63 would diminish the desired pinching and tensioning effect, the chosen arrangement for the preferred embodiment is as shown in FIGS. 15 and 16.

In FIG. 15, the cassette is arranged as it is in FIG. 1, with the plane thereof (the medial plane normal to the reel axes) tilted at the pitch angle α with respect to the axis of the scanning guide 21b. Thus the tape can pass from the supply reel 14b and around the now axially parallel guide 63b and to the guide 21b without any twists in the tape upstream from the scanning guide, and the problems related to non-uniform tape stretch are entirely avoided. The twist and accompanying uneven stretch seen in the figures downstream from the capstan 66b and pinch roller 64b can be neglected because the tape tension can be made to be much less in this area. The operating tension for scanning is established between the reel 14b (or guide 63b if it is used as pinch roller for a drag idler as in FIG. 1) and the capstan 66b and pinch roller 64b, which latter pair of pinching rollers serve also to isolate the tape downstream therefrom so that only enough tension is needed to pull the tape back to the takeup reel 15b. Thus the twists shown leading into and away from guide 171b have no deleterious effect on the recording or reproduction processes upstream from the capstan. As will be seen below, the tape cannot be guided through the path desired from cassette to scanning guide to capstan and back to cassette without twisting at some point. What the arrangement of FIG. 15 does is to shift all the twists to points downstream from the capstan, where they do no harm.

While the guide 171b is still formed on a cylindrical surface that is axially parallel to the scanning guide 21b, for ease in retraction and insertion, it is provided with angled leading and trailing edges 172b and 173b, particularly shown in FIG. 16. Angled leading edge 172b is required for the purpose of decreasing the pitch angle of the tape entering its path around guide 171b, so that even through the tape follows a longer climbing path, it still comes out at the same level as the tape coming into guide 21b; the term "level" being meant as before to be understood as if the cassette medial plane were horizontal. The angled edge 173b is then needed to restore the tape to the original pitch angle α (or its opposite) so that the tape comes out from guide 171b not only at the same level, but proceeds downstream therefrom in the same plane as that in which the tape approaches guide 21b, this plane being of course the plane of the cassette. The tape is then bent around guide 23b and returned to the cassette.

The invention, as conceived and claimed, is considered to encompass this and other forms of guides that function to first decrease and then restore the original pitch angle (or gradient) of the tape in order to compensate for the greater length of the climbing path that the tape must take to return around guide 21b without touching it or rubbing on the tape that is being scanned on the guide.

The guide 171 shown in the embodiment of FIGS. 1 and 2 actually has the parallel leading and trailing edges of FIG. 14, combined with the cassette mounting arrangement of FIG. 15. What holds the tape in correct path for return to the cassette is the top and bottom walls 27 and 176 (FIG. 7) of the vacuum housing, which structure however produces some tape edge wear and powdering of the oxide, both of which are avoidable with use of the guide form 171b of FIGS. 15 and 16. Either way, the guide 171 in retracted position (FIG. 7) fits into a conforming opening in the floor 176, the two parts of the floor being linked by solid portions fitting in generatrical slots 177 of the guide 171 (FIG. 6) so that the strength of the two parts of floor 176 is increased while still permitting the guide 171 to rise and retract between them.

Raising and lowering of the guide 171 is accomplished by means of belt 126 (FIG. 9), which has a run 126a stretched between a pair of pulleys 178 and 179. A portion of the belt is clamped by a clamp 181 to a pin extending from a mounting base 182 that serves to mount the guide 171. The base 182 has tubular bore fitting for sliding motion around the fixed cylindrical lower portion 183 of guide 21, which in turn is solidly mounted on a pedestal 184, see also FIGS. 6, 7 and 8. The pin and clamp 181 extend radially through a slot 186 in a framework partition 187 (FIG. 9) thus securing the base 181 and guide 171 against rotational displacement.

DRIVES FOR HEADS AND CAPSTAN

Also shown in FIG. 6 is a head driving motor 188 controlled by a line 189 from the controller, so as preferably to be turned on for continuous driving of the rotating heads 140a and 140b as soon as the transport is turned on. The motor 188 drives through a belt 191 coupled to a head driving shaft 192, which is journalled for rotation in an interior bore of the fixed lower cylinder 183 of guide 21. The shaft 192 is solidly attached to the rotating upper portion 193 (FIG. 7) of the guide 21, upon which the heads 140a and 140b are mounted.

The capstan 66 is mounted in an anti-friction bearing 194 (FIG. 7) and is driven by a belt 196 from a motor 197 (FIG. 5) that is controlled by a line 198 from the controller 43. Preferably the capstan is set in rotational operation concurrently with pinching of the pinch roller 64 during the play-record modes, and is stopped at all other times.

As for the drag idler 67 (FIG. 4), the "drive" counterpart is in effect the opposite: the idler 67 is mounted in bearings 201, 202 on a shaft 203, which in turn is braked by a brake shoe 204 mounted on a leaf spring 206. Also shown in FIG. 4 is a leaf spring 207 which holds pinch idler 133 in non-pinching position, bearing against the idler itself in the retracted (down) position, and against the mounting bracket 129 in the up position. Also shown in FIGS. 2 and 7 is a longitudinal recording and reproducing head 208.

UNLOADING AND REWINDING

Preferably the tape loop is unloaded from the vacuum housing and pulled back into the cassette before the tape is rewound. At the end of tape or at the end of the recorded portion thereof, a signal previously recorded by head 208 on a longitudinal track of the tape, is read by head 208 and a signal may be sent to the controller 43 to stop the capstan 66 and reel drive and un-pinch the pinch rollers 64 and 63. Thereafter, under either manual or automatic program control, the controller 43 causes retraction of the two pinch rollers and the guide 171, as by energizing motor 118 (FIG. 4) in reverse through line 209. Upon signal from micro-switch 164 (FIG. 13) that the rollers and guide 171 are "down", the controller 43 deenergizes motor 118 and energizes solenoid 57 (FIG. 3) together with line 41 to motor 37, to drive reel 14 in the rewind mode. Of course the tape loop is rewound on reel 14 first, and subsequently all the tape that had been stored on reel 15. Beginning of tape may be signaled to the controller by the operator manually, or automatically by means of photoelectric or other sensing devices standard in the art; and the controller then turns off the reel drive (lines 41, 61).

We claim:

1. In a rotary head type magnetic recording and/or reproducing apparatus having a cylindrical guide drum within which the rotary head is rotated, the combination comprising:

means for mounting a tape cassette in the apparatus;
   a housing and differential air pressure means therefor for communicating with the mounted cassette and encompassing at least a portion of the guide drum to pull an elongated loop of tape from the cassette with a portion of the loop wrapped helically around the guide drum in the region of the rotary head; and
   means operable at a predetermined length of the loop of tape to separate the opposite shanks of the loop.

2. The apparatus described in claim 1, wherein:

said helically wrapped portion of said tape loop has a predetermined pitch angle and leaves said guide drum in a tangential extension portion also contained within said housing and defined by said predetermined length of tape loop;
   said housing is provided with rotating means including an element operable for insertion into the bight of said loop extension for circumferential movement of said tape thereabout; and
   means are provided for inactivating the differential pressure of said housing after said rotating means and shank separating means are operated.

3. The apparatus described in claim 2, wherein:

said rotating means includes a capstan positioned for engaging the outer side of said tape in said loop extension; and
   a retractable pinch roller positioned for operatively engaging the inner side of said tape in said loop extension.

4. The apparatus described in claim 3, wherein said differential air pressure housing means includes:

a housing defining a threading path for said tape loop;
   vacuum source means for pulling said loop to extend from said cassette into said housing and along said path to said capstan; and
   means for sensing and signaling the arrival of said loop at said capstan.

5. The apparatus described in claim 4, wherein said loop shank separating means includes:

at least one guide element having a retracted position out of said tape path during threading of the transport, and an operating position between said tape shanks in the helical portion of said path and engaging and guiding the radially most outward and downstream shank during operation of the transport;
   whereby tape returning to said cassette from said capstan, during transport operation, is prevented from rubbing against tape moving toward said capstan from said cassette.

6. The apparatus described in claim 5, wherein:

said vacuum source means is coupled to said housing in the vicinity of said capstan to draw said tape loop through said housing to said capstan, with said loop bight held in open expanded condition at the path-end portion of said housing;

said vaccum source means also being coupled to said housing on the radially outward side of said helical portion of said path defined by said housing, for holding the outer and downstream shank of said tape loop spaced radially away from the inner and upstream tape loop shank to permit movement of said pinch roller and said shank-separating means from retracted to inserted position between said tape loop shanks.

7. The apparatus described in claim 6, wherein:

said housing on the radially most outward side of said helical portion of said path is defined by manifold means communicating with said vacuum source, and also with said path as by means of a plurality of separate openings in said manifold spaced circumferentially around said path;

whereby said outer shank of said tape loop is held against said manifold during threading and during the interpositioning of said shank separating means in movement of the latter from retracted to operating position.

8. The apparatus described in claim 7, and also including threading and operational controller means operable to cycle automatically and sequentially through a tape feeding mode, an intra-loop insertion mode, and a standby mode;

said controller in said tape feeding mode being coupled to said cassette mounting means to cause reverse operation of the cassette takeup reel to cause said loop to be fed into said housing with sliding motion between the radially outward loop shank and the manifold, and non-sliding laying-on motion of the inner shank against said guide drum;

said controller in said tape feeding mode also being coupled to activate said vacuum source for holding said sliding outer shank against said manifold and said bight against the path-end portion of said housing.

9. The apparatus described in claim 8, wherein said means for sensing and signaling the arrival of said loop at said capstan includes a pressure-sensitive switch coupled to said housing at the path-end portion thereof, as by means of an opening that is closed off by arrival of the tape, said switch being coupled to said controller to stop the feeding rotation of said supply reel and to initiate the intra-loop insertion mode of said controller.

10. The apparatus described in claim 9, wherein:

insertion means are provided and are coupled to said controller to move said shank separating means and said pinch roller between retracted and standby positions within said loop and bight, resepctively;

said insertion means including means for signaling the arrival of said shank separating means and said pinch roller in said retracted and standby positions, respectively said signalling means being coupled to said controller for causing inactivation of said vacuum source and initiation of the standby mode of said controller.

11. The apparatus as described in claim 10, wherein said pinch roller insertion means includes:

a cylindrical rail mounted eccentric and parallel to the axis of said pinch roller;

a block mounted for sliding translation longitudinally on said rail and for pivoting motion in a plane normal to said rail;

a shaft extending from said block along the axis of and rotatably mounting said pinch roller; and first motor means coupled to said block and to said controller for translating same along said rail between said retracted and standby positions of said pinch roller;

said first motor means including limit switch means for signaling the arrival of said block in said retracted and standby positions, respectively.

12. The apparatus as described in claim 11, wherein said pinch roller insertion means also includes:

cam means mounted parallel to said rail and cam follower means therefor on said block for holding said pinch roller in a non-pinching position during translation between said retracted and standby positions thereof, said cam permitting pivoting movement of said block and pinch roller about said rail and between said non-pinching position and a pinching position engaging said tape and capstan, only while said pinch roller is in said standby position; and solenoid and return spring means for moving said pinch roller from non-pinching to pinching position and return, respectively, said solenoid being coupled to said controller for selective operation in record and reproduce modes.

13. The apparatus as described in claim 12, wherein means are provide and are coupled to said controller for operationally driving said rotating head drum, said capstan and said cassette reels in forward direction during said record and reproduce modes, and said reels along in reverse direction during a rewind mode.

14. The apparatus as described in claim 13, wherein said controller is coupled to said driving means, said solenoid and said pinch roller and said shank-separating means to cause retraction of said pinch roller and shank-separating means, followed by operation of said reels to withdraw said tape loop into said cassette, during an unloading mode of said machine.

15. The apparatus described in claim 14, and also including:

a retractable idler on said tape path between said cassette positioning means and said guide assembly for guiding the upstream loop shank in which tape leaves said cassette in normal forward record reproduce mode; and pneumatic means for drawing said loop shanks to a position bracketing said idler during threading of said tape.

16. The apparatus described in claim 15 wherein said idler is a drag idler pinch roller, and a drag idler is provided outside the tape loop for engaging said tape between said drag idler and drag idler pinch roller to exert a holdback tensioning force on said tape around said guide assembly.

17. The apparatus as described in claim 16, wherein said drag idler pinch roller is coupled to said drive means and said controller for movement between retracted and standby positions and between pinching and non-pinching positions concurrently with said capstan pinch roller.

18. The apparatus described in claim 1, wherein said shank separating means comprises:

a curved element partly encircling said guide drum in the sector thereof around which said tape loop shanks are bent;

said element being spaced radially away from said guide drums at the midpoint of said sector; and said element being mounted for movement generally parallel to the axis of said guide drum, and between a retracted position clearing said tape path and an operating position inserted between the shanks of said tape loop.

19. The apparatus described in claim 18, wherein said curved element has an edge portion facing said capstan, said edge portion being tilted in the same direction as said tape shanks with respect to the axis of said guide drum;

whereby said tape loop outer and downstream shank is guided in substantially a reverse helical path around said curved element, but at a reverse pitch angle smaller than the pitch angle of said upstream and inner tape loop shank, and may thereby be caused to leave the curved element at the same plane normal to said guide drum axis as that in which the incoming tape arrives at said guide drum.

20. The apparatus described in claim 19, wherein the other edge portion of said curved element remote from said capstan is also tilted in the same direction as said tape shanks with respect to the axis of said guide drum; whereby the tape leaving said curved element may be caused to leave not merely at said same plane but also entirely in said same plane, and returns naturally to said cassette without the need for tape edge guiding.

21. The apparatus described in claim 20, wherein said curved element is of cylindrical form with generatrices parallel to the axis of said guide drum.

22. The apparatus described in claim 20, wherein both of said edge portions are equally inclined and the tape leaves said curved element in a path parallel to that of the tape approaching said guide drum.

23. The apparatus described in claim 18, wherein:

said curved element is a portion of a cylinder with generatrices parallel to the axis of said guide drum, and presenting upstream and downstream tape guiding edges defined by generatrices; and said cassette mounting means is arranged to mount said cassette with the reels thereof axially parallel to said guide drum.

24. The apparatus described in claim 2, wherein said cassette mounting means is arranged to position said cassette in a plane inclined to said cylindrical guide drum at said predetermined pitch angle.

25. The apparatus described in claim 2 wherein said cassette mounting means is arranged to position said cassette with the reels in axial parallelism with the axis of said cylindrical guide drum.

* * * * *